United States Patent Office 3,330,156
Patented July 11, 1967

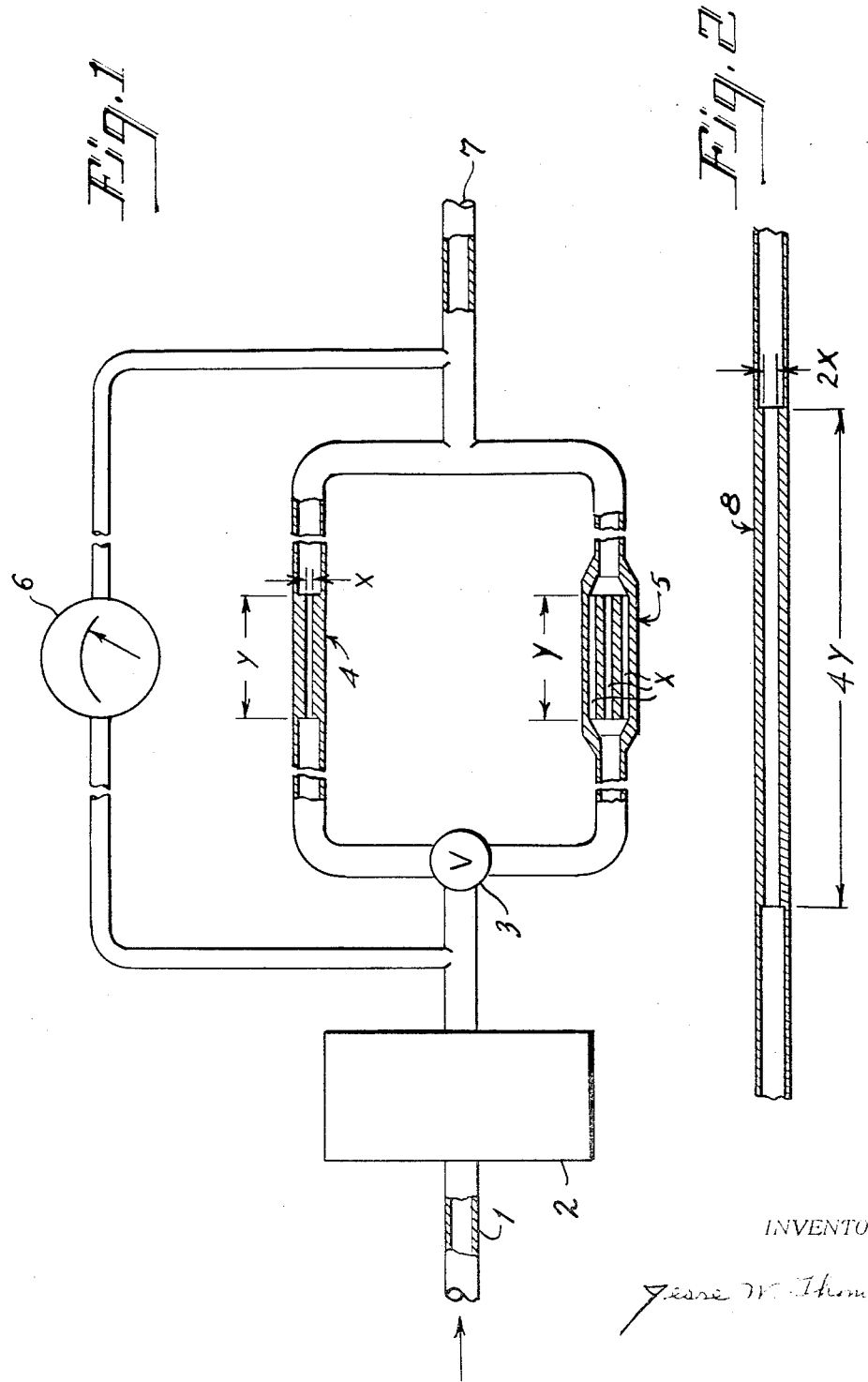

3,330,156
FLUID FLOWMETERS
Jesse W. Thomas, 550 Fairmount Ave.,
Chatham, N.J. 07928
Filed Sept. 8, 1965, Ser. No. 485,730
1 Claim. (Cl. 73—197)

ABSTRACT OF THE DISCLOSURE

This invention is a fluid flow measuring apparatus, comprising two capillary type restrictors, where the fluid flow may be diverted to either of said restrictors, and the flow measured by obtaining a pressure drop reading on a graduated scale. The said restrictors are designed so that the sensitivity of one of them is a constant factor times the sensitivity of the other restrictor, at any pressure drop. This makes it possible to use the same graduated scale for both sensitivity ranges.

---

This invention relates to an apparatus for measurement of flow of gases or liquids, hereafter designated fluids.

Measurement of flow of fluids by measurement of pressure difference across a resistance, such as an orifice or capillary tube, is old in the art. In particular, capillary tubes have been used to measure low flow rates. A convenient method of measuring a wide range of low flow rates is to use a device containing several capillary tube measuring elements each measuring accurately a limited range of flow rates, with means of switching the flow from one measuring element to another. In the past use of this type of device has been severely handicapped because the ratio of sensitivity of the different flow measuring capillaries depended on the pressure difference across the capillary tubes. In other words, at some given reading of the pressure sensor, say one inch of water pressure difference, capillary A might be 10 times as sensitive as capillary B, whereas at 5 inches of water capillary A might be 8 times as sensitive. This is a serious disadvantage, as the user of the instrument then cannot use a single-scale pressure sensor, and use a simple ratio of sensitivity to obtain flow rates readings for the various flow measuring capillary elements.

The present invention eliminates this difficulty. Capillary tube elements are designed so that for a given pressure difference across the system, the flow M through one element becomes $k_1$M when switched to another element, $k_2$M when switched to a third element, etc., where the values $k_1$, $k_2$, etc., are independent of the pressure difference actuating the pressure sensor. In other words, there is a constant factor of difference in flow when switching from one capillary element to another, and this factor does not depend on what fraction of full scale reading exists on the pressure sensor. This improvement is of considerable practical importance, as multiple scales on the pressure sensor are unnecessary, simplifying both manufacture and use of the apparatus. In addition, the present invention includes an entrance filter which removes particles from the entering fluid, which otherwise might clog the flow elements, and a means of switching the flow from one flow element to another.

FIGURE 1 shows one embodiment of the invention. Fluid to be measured enters the pipe 1, passes through a filter 2, into a switching valve 3 which directs the fluid either into capillary element 4 or capillary element 5. Capillary element 4 consists of one capillary tube of length Y and diameter X. Capillary element 5 consists of three capillary tubes, each of the same length Y and diameter X. Pressure sensor 6, calibrated in terms of flow, indicates the flow rate. The fluid leaves through tube 7.

FIGURE 2 shows capillary element 8, which may be used in place of capillary element 5 to form another embodiment of the invention. Capillary element 8 has length 4Y and diameter 2X.

In the embodiment of FIGURE 1, the flow through capillary element 5 will be always exactly three times the flow through capillary element 4 at the same pressure drop. Likewise, in the embodiment formed by replacing capillary element 5 with capillary element 8, the flow through capillary element 8 will be always exactly four times the flow through capillary element 4 at the same pressure drop.

The basis of design for the capillary elements as specified above is given by a simplified form of an equation due to Brillouin[1] and verified by Benton.[2] The equation given below applies only in the laminar flow region, where Reynolds numbers are under 2100.

(1) $$\Delta P = \frac{128M}{\rho_{av} \pi D^4}\left[\eta L + \frac{M}{8\pi}\right]$$

where $\Delta P$ = pressure difference across capillary element
$M$ = flow rate
$\rho_{av}$ = density of fluid at average pressure
$D$ = diameter of capillary
$\eta$ = viscosity of fluid
$L$ = length of capillary
$\pi = 3.1416$ There are three different methods of selecting flow elements so that, as described previously, the sensitivity to flow of one element is exactly $k$ times that of another, independent of reading of the pressure sensory element.

The first method is to set the quantity L large and flow rate M small so that the second term of Equation 1 is negligible in comparison to the first, so that very closely, (2) $$\Delta P = \frac{128 M \eta L}{\rho_{av} \pi D^4}$$

Capillary elements for which Equation 2 holds will show sensitivity responses differing by $k$ factors which are independent of the reading of the pressure sensory element.

The second method is to use capillary elements consisting of one or more capillaries all having the same length and diameter, different elements having different numbers of capillaries. Since the flow through $nx$ capillaries is always exactly $n$ times the flow through $x$ capillaries, at any pressure differential, again the capillary elements will have sensitivity responses differing by $k$.

The third method is best illustrated by an example. Suppose it is desired to select a capillary tube, designated "2," so that at any and all $\Delta P$'s, it will have exactly $k$ times the flow M of another capillary, designated "1." Letting subscript "1" designate conditions for capillary 1, with subscript "2" designating conditions for capillary 2, by definition at some fixed differential pressure $a$ there is required a flow of $M_{1(a)}$ in capillary 1 and $kM_{1(a)}$ in capillary 2, so that (3)
$$\frac{128 M_{1(a)}}{\pi \rho_{av} D_1^4}\left(\eta L_1 + \frac{M_{1(a)}}{8\pi}\right) = \frac{128 k M_{1(a)}}{\pi \rho_{av} D_2^4}\left(\eta L_2 + \frac{k M_{1(a)}}{8\pi}\right)$$

---

[1] Brillouin, M.: "Lecons sur la Viscosity des Liquids et des Gas," vol. 1, p. 133.
[2] Benton, A. F.: "The End Correction in the Determination of Gas Viscosity by the Capillary Tube Method," Physical Review 14, No. 5, p. 403.

The above equation may also be written for another differential pressure $b$.

(4)
$$\frac{128 M_{1(b)}}{\pi \rho a v D_1^4}\left(\eta L_1+\frac{M_{1(b)}}{8\pi}\right)=\frac{128 k M_{1(b)}}{\pi \rho a v D_2^4}\left(\eta L_2+\frac{k M_{1(b)}}{8\pi}\right)$$

Dividing Equation 3 by Equation 4, (5)
$$\frac{M_{1(a)}}{M_{1(b)}}\left(\frac{\eta L_1+\frac{M_{1(a)}}{8\pi}}{\eta L_1+\frac{M_{1(b)}}{8\pi}}\right)=\frac{M_{1(a)}}{M_{1(b)}}\left(\frac{\eta L_2+\frac{k M_{1(a)}}{8\pi}}{\eta L_2+\frac{k M_{1(b)}}{8\pi}}\right)$$

and (6)
$$\frac{8\pi\eta L_1+M_{1(a)}}{8\pi\eta L_1+M_{1(b)}}=\frac{8\pi\eta L_2+k M_{1(a)}}{8\pi\eta L_2+k M_{1(b)}}$$

(7)
$$\frac{8\pi\eta L_1+M_{1(a)}}{8\pi\eta L_1+M_{1(b)}}=\frac{8\pi\eta(L_2 1 k)+M_{1(a)}}{8\pi\eta(L_2 1 k)+M_{1(b)}}$$

It is apparent, to satisfy (6), that (8) $\quad L_1=L_2/k$

The above development establishes that the second capillary elements $L_2$ must be $k$ times the length of the first element $L_1$, if it is to have $k$ times the flow of the first element at all $\Delta P$'s. Consequently, the quantity $k L_1$ can be substituted in Equation 3 for $L_2$ giving (9)
$$\frac{1}{D_1^4}=\left(\eta L_1+\frac{M_{1(a)}}{8\pi}\right)=\frac{k}{D_2^4}\left(\eta k L_1+\frac{k M_{1(a)}}{8\pi}\right)$$

from which

(10) $\quad \left(\dfrac{D_2}{D_1}\right)^2=k$

Combining Equations 8 and 10

(11) $\quad k=\dfrac{L_2}{L_1}=\left(\dfrac{D_2}{D_1}\right)^2$

Equation 11 shows that the diameter ratios of the capillaries must be the square root of the ratios of their lengths, to have sensitivity responses differing by $k$ factors which are independent of pressure differential across the capillaries. A specific example, the design of a three element flowmeter for measuring air at 25° C., 760 mm. Hg pressure follows. The density of air is $1.185 \times 10^{-3}$ grams per cubic centimeter and the viscosity is $1.83 \times 10^{-4}$ poises. The first capillary element A is 2.0 cm. long and has a diameter of 0.04 cm. The pressure drop and flow rate through this capillary by Equation 11 is given in the first two columns of the accompanying table. It was desired to have a second capillary B with exactly four times the flow rate of A at all pressure drops, and a third capillary C with 25 times the flow rate of A at all pressure drops. By Equation 11, capillary B ($k=4$) must have a length of $(2.0)(4)=8.0$ cm., and diameter of $(0.04)(\sqrt{4})=0.08$ cm. Likewise, capillary C ($k=25$) must have a length of $(2.0)(25)=50$ cm., and a diameter of $(0.04)(\sqrt{25})=0.20$ cm. Substituting these values into Equation 1, the values shown in the third and fourth columns of the table were obtained.

The fifth column shows the ratio of flow, flow of capillary B divided by flow of capillary A, and the sixth column the same for capillary C. It is seen by actual calculation using experimentally verified Equation 1, that the ratios of sensitivity are independent of pressure drop.

| Pressure Drop, dynes/cm.² | Flow Rates, g./sec. | | | Flow Ratios | |
|---|---|---|---|---|---|
| | Capillary A | Capillary B | Capillary C | B to A | C to A |
| 250 | 5.00×10⁻⁵ | 2.00×10⁻⁴ | 1.25×10⁻³ | 4.0 | 25.0 |
| 500 | 1.00×10⁻⁴ | 4.00×10⁻⁴ | 2.50×10⁻³ | 4.0 | 25.0 |
| 1,000 | 2.00×10⁻⁴ | 8.00×10⁻⁴ | 5.00×10⁻³ | 4.0 | 25.0 |
| 2,600 | 5.00×10⁻⁴ | 2.00×10⁻³ | 1.25×10⁻² | 4.0 | 25.0 |
| 5,450 | 1.00×10⁻³ | 4.00×10⁻³ | 2.50×10⁻² | 4.0 | 25.0 |
| 12,000 | 2.00×10⁻³ | 8.00×10⁻³ | 5.00×10⁻³ | 4.0 | 2250 |
| 38,000 | 5.00×10⁻³ | 2.00×10⁻² | 1.25×10⁻² | 4.0 | 5.0 |

L=2. cm.  L= 8.0 cm.  L=50.00 cm.
D=0.04 cm.  D=0.08 cm.  D=0.20 cm.

I claim:

A fluid flow measuring apparatus comprising two parallel branch lines having two junctions; each of said lines having a capillary type restrictor, one of the said restrictors having a given sensitivity, pressure drop-flow relationship, which is different from the sensitivity of the other restrictor by a given factor, said parallel branch lines connected to a common source and exit line, a switching means at one of the junctions of said parallel branch lines to divert the flow to one or the other of the branches, a pressure measuring means connected upstream and downstream of the junction of the parallel branch lines, whereby the range of measurement of the apparatus may be changed by switching the flow from one branch line to the other to modify the sensitivity of the apparatus by said factor.

References Cited

UNITED STATES PATENTS

| | | | |
|---|---|---|---|
| 2,821,085 | 1/1958 | Gehre | 73—197 |
| 3,071,001 | 1/1963 | Goldsmith | 73—211 |
| 3,251,225 | 5/1966 | Luft | 73—198 XR |

JAMES J. GILL, *Primary Examiner.*

RICHARD C. QUEISSER, *Examiner.*

E. D. GILHOOLY, *Assistant Examiner.*